Feb. 19, 1952     B. N. FISHER     2,586,422
TONE ARM INDEXING APPARATUS

Filed Nov. 6, 1946     3 Sheets-Sheet 1

INVENTOR
BERNE N. FISHER
BY
*James & Franklin*
ATTORNEY

Feb. 19, 1952

B. N. FISHER 2,586,422

TONE ARM INDEXING APPARATUS

Filed Nov. 6, 1946

INVENTOR
BERNE N. FISHER
BY
ATTORNEY

Feb. 19, 1952
B. N. FISHER
2,586,422
TONE ARM INDEXING APPARATUS
Filed Nov. 6, 1946
3 Sheets—Sheet 3
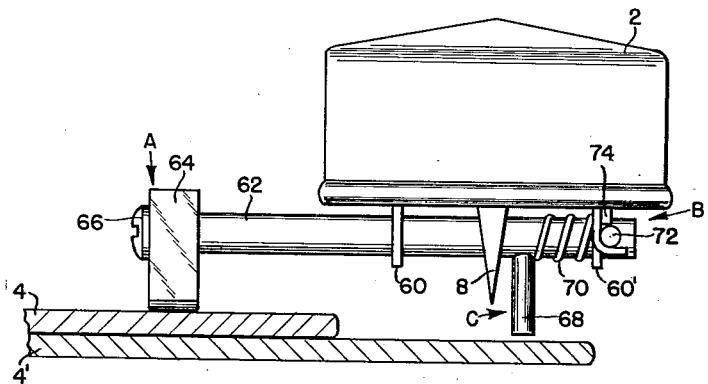
FIG. 12
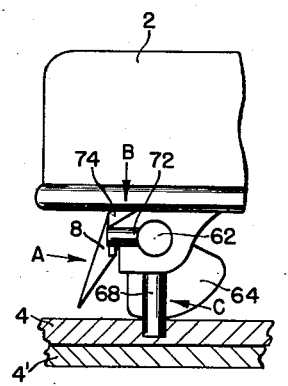
FIG. 13
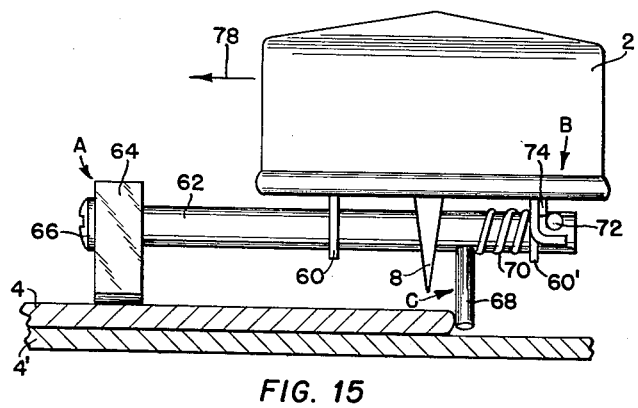
FIG. 15
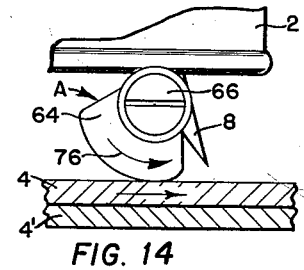
FIG. 14
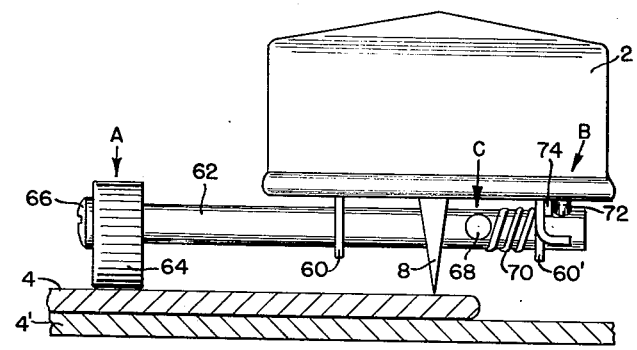
FIG. 17
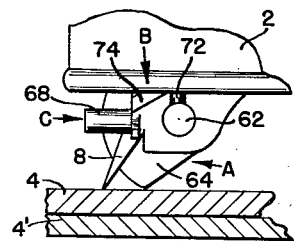
FIG. 16
FIG. 18
INVENTOR
BERNE N. FISHER
BY
*James & Franklin*
ATTORNEY Patented Feb. 19, 1952

2,586,422

UNITED STATES PATENT OFFICE 2,586,422

TONE ARM INDEXING APPARATUS

Berne N. Fisher, New York, N. Y., assignor to General Instrument Corporation, Elizabeth, N. J., a corporation of New Jersey Application November 6, 1946, Serial No. 708,055

16 Claims. (Cl. 274—1)

This invention relates to an indexing apparatus for a phonograph tone arm, which apparatus ensures that the stylus carried by the tone arm will be deposited in a desired position on a record irrespective of the size of the record.

As is well known, phonograph records of the disc type are commercially available in a variety of sizes, the most common of which have diameters of 10 inches and 12 inches. Most automatic record changers adapted to play a number of these records in succession can be set to play either one size or the other but not both sizes at once. There do exist a number of automatic record changers which are adapted to play a series of indiscriminately mixed records but in order that the tone arm be deposited at the initial groove of the record to be played irrespective of its size, complicated and fragile control linkages have had to be employed. This makes for complexity and consequent expense in the record changer and for a marked lack of dependability in its operation. Furthermore, the system thus constructed is not flexible and will work only for the two standard sizes of records and for no other.

It is the prime object of the present invention to provide a device which may be attached to any conventional phonograph tone arm and which will ensure that the stylus carried by the tone arm will be deposited on the upper surface of the record to be played at a desired point irrespective of the size of the record. This desired point is customarily the initial playing groove of the record and the invention will hereinafter be described with this in mind. It will be obvious, however, that if a different depositing point for the stylus is desired, it could be attained by a simple modification of the structure about to be described.

It is a further object of the present invention to provide such an apparatus which, though carried by the tone arm, is small and light, therefore not increasing materially the inertia or weight of the tone arm.

It is still another object of the present invention to so construct the apparatus that it will not only ensure that the stylus is deposited at the proper point on the top surface of the record to be played but will also ensure that the tone arm moves inwardly to that position.

It is still another object of the present invention to provide apparatus which will contact the top surface of the record to be played, maintain the stylus above that top surface while causing the tone arm to move inwardly thereover, and when the tone arm has moved inwardly to a point where the stylus is properly positioned with respect to the record, then to deposit the stylus on the record. Contact with the periphery of the record to be played causes actuation of the mechanism and subsequent depositing of the stylus.

Yet another object of the present invention is to provide apparatus of the type described in which means are provided, once the stylus has been deposited on the top surface of the record, to completely disengage the apparatus from the record so that the tone arm may operate in wholly unhindered fashion. Such an apparatus, when the stylus has been removed from the record, is so designed as to return to an operative position ready for the next record.

To the accomplishment of the foregoing objects and such other objects as may hereinafter appear, the present invention relates to the tone arm indexing apparatus as defined in the appended claims and as described in this specification, taken together with the appended drawings, in which:

Fig. 12 shows another embodiment of the apparatus, its position corresponding to that of Fig. 2;

Fig. 13 is a side view of Fig. 12;

Fig. 14 is a view similar to Fig. 13 but taken from the opposite side;

Fig. 15 is an end view showing the apparatus an instant after it has contacted the periphery of the record to be played;

Fig. 16 is a view similar to Fig. 14 but showing the stylus in its deposited position;

Fig. 17 is a front view showing the apparatus with the stylus deposited on the record; and Fig. 18 is a view similar to Fig. 16 but taken from the opposite side.

Figure 1:
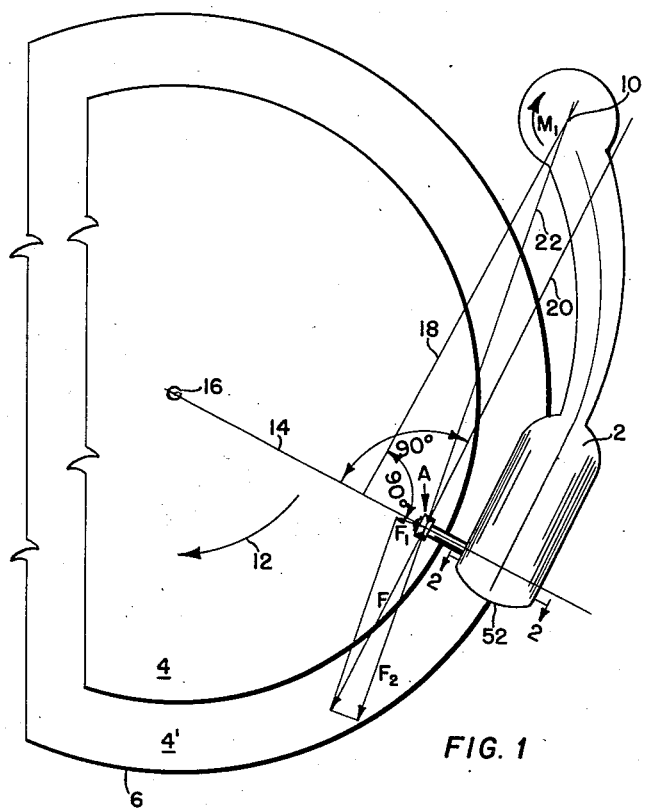
Fig. 1 is a top view of a tone arm-turntable combination, the tone arm carrying the apparatus of the present invention, with the various forces active thereon indicated by vectors.
Figure 2:
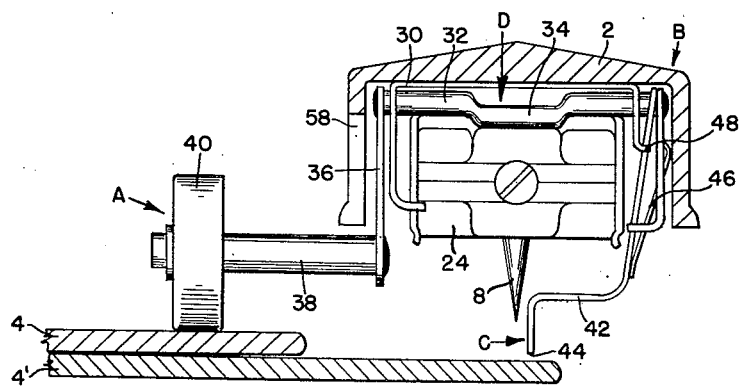
Fig. 2 is a cross-sectional view on enlarged scale taken along the line 2—2 of Fig. 1 showing the position one embodiment of the apparatus assumes after it has made contact with the top surface of the record to be played and has moved a short distance inwardly thereover.

The apparatus of the present invention includes a member A which is so positioned with respect to the tone arm 2 that as the tone arm is lowered with respect to records 4 which are rotated upon the turntable 6, the member A will make contact with the upper surface of the topmost record 4 on the turntable no matter what may be the diameter thereof. In Figs. 2 through 18, the turntable has been omitted and two records 4 and 4' have been illustrated, the record 4 being the topmost record and having a diameter of 10 inches and the record 4' being the lowermost one and having a diameter of 12 inches. It will be seen particularly with reference to Fig. 5 that as the tone arm 2 is deposited, the member A extends inwardly therefrom a distance sufficient to make contact with the upper surface of the smaller record 4 while the stylus 8 carried by the tone arm is still outwardly disposed with respect to the larger record 4'. This relationship is of course necessary if the apparatus is to function even with records of the size of record 4'. The member A is so shaped and so positioned as to retain the stylus 8 above the top surface of the record 4 to be played so that the tone arm may move inwardly with respect to that record without opposition. The member A tends to assume a second position in which the stylus 8 is lowered to the top surface of the record 4 to be played so that reproduction of that record may be carried out. A mechanism, generally designated B, is provided to maintain the member A in its stylus-holding position and the apparatus is also provided with a means, generally designated C, which is adapted to make contact with the periphery of the record 4 to be played as the tone arm 2 and apparatus move inwardly thereover, said peripheral contact serving to release the mechanism B and permit the member A to move to its stylus-depositing position, whereby the stylus is deposited on the top surface of the record 4 to be played adjacent to but inwardly disposed with respect to the periphery of that record so that the stylus 8 may be engaged by the initial groove of the record and reproduction may proceed. At the same time that the member A moves to deposit the stylus 8, the means C is removed from contact with the periphery of the record 4 so that the tone arm 2 may then move freely inwardly with respect to the record during reproduction. It will be clear from a study of the various figures of the drawings appended hereto, and particularly Fig. 5, that the means C which makes contact with the periphery of the record 4, projects below the member A a distance somewhat less than the thickness of a record so that the tip of the means C will, in the situation illustrated in the figures in which the topmost record 4 is a smaller record, pass over the surface of the record 4' without contacting its periphery, contact being made only with the periphery of the topmost record. By this arrangement, the stylus 8 on the tone arm 2 will be deposited at the initial groove of the topmost record on the turntable irrespective of that record's size and this without the necessity of complicated linkages.

As a further feature the embodiment of Figs. 2 through 11 includes an additional means D which is effective, after the stylus 8 has been deposited on the top surface of the record 4, to lift the member A out of engagement with the record surface.

As an additional feature, the member A may, in addition to holding the stylus 8 above the top surface of the record 4 and then depositing it thereupon, also function to draw the tone arm 2 inwardly with respect to the record 4 until the stylus 8 has been engaged by the grooves in the record. Fig. 1 illustrates the manner in which this effect takes place. The tone arm 2 is there shown as pivotable about a vertical pivot point 10. The tone arm 2 is curved and the member A projects therefrom inwardly with respect to the record 4. As the tone arm is lowered with respect to the turntable 6, which is rotating in the direction indicated by the arrow 12, the member A is deposited on the upper surface of the record 4. If a radius 14 be drawn from the center of rotation 16 of the turntable 6 through the point at which the member A makes initial contact with the record 4, and if that point be outwardly disposed from the intersection between the radius 14 and a perpendicular 18 drawn thereto from the pivot point 10 the frictional effect of the record 4 upon the member A will draw the tone arm 2 inwardly over the record. This will result because the effect of the record 4 upon the member A is exerted tangentially in the direction of the line 20 as indicated by the arrow F. If this force be resolved into components relative to the line 22 drawn between the member A and the pivot point 10, the force $F_1$ active upon the tone arm 2 via the member A will exert moment $M_1$ on the tone arm tending to pivot it in a clockwise direction about its pivot point 10, thus causing the tone arm to move inwardly with respect to the record 4. It will be clear from Fig. 1 that so long as the member A is deposited on the record 4 at a point on a radius 14 thereof outwardly disposed with respect to the intersection of lines 14 and 18, this effect will obtain. It is only necessary that the member A move the tone arm inwardly with respect to the record 4 an amount sufficient to permit engagement between the stylus 8 and the groove of the record, that engagement thereafter controlling the motion of the tone arm.

Figure 3:
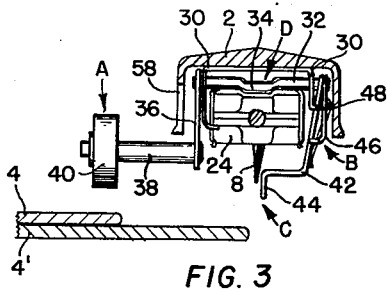
Fig. 3 is a view similar to Fig. 2 but showing the apparatus just prior to making contact with the top surface of the record to be played.
Figure 4:
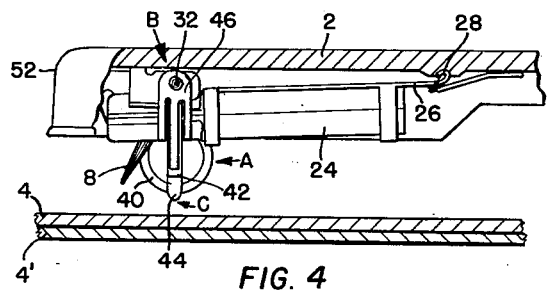
Fig. 4 is a side view, partially broken away, of the apparatus of Fig. 3.
Figure 5:
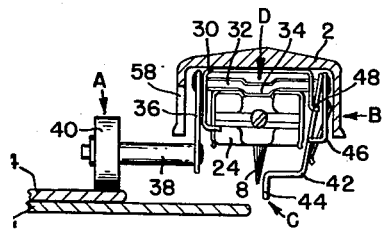
Fig. 5 is a cross-sectional view similar to Fig. 2 but showing the position of the apparatus just as it makes contact with the record to be played.
Figure 6:
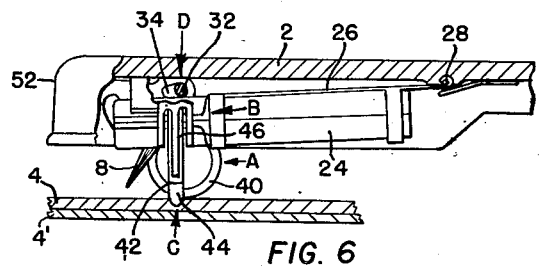
Fig. 6 is a side view, partially broken away, of the apparatus of Fig. 2.
Figure 11:
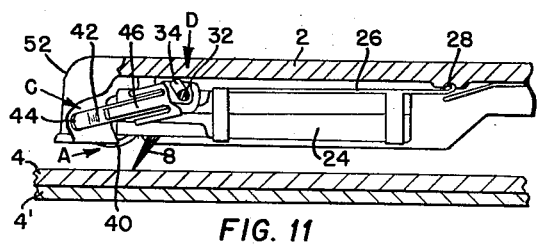
Fig. 11 is a side view, partially broken away, taken from the side opposite Fig. 9.

In the embodiment illustrated in Figs. 2 through 11, the tone arm 2 is provided with a pick-up unit 24 which is mounted in any suitable manner on a leaf 26 which is in turn pivoted at 28 to the tone arm 2, the pick-up unit thus being pivotable between the position best shown in Figs. 4 and 6, in which it is downwardly inclined with respect to the tone arm 2 and the position best shown in Fig. 11 in which it assumes a parallel position with respect to the tone arm 2. Mounted in U-shaped bracket 30 suitably fastened to the top of the tone arm 2 is a shaft 32, the shaft being positioned between the pick-up unit 24 and the upper portion of the tone arm 2 and having an offset portion 34 and being rotatable within the brackets 30. To that end of the shaft 32 which is directed toward the center of rotation 16 of the turntable 6 is attached an arm 36 to the extremity of which is attached a second shaft 38 which carries at its extremity a wheel 40 rotatably mounted thereon. Attached to one end of the shaft 32 for simultaneous rotation therewith is the means C which in this embodiment comprises a finger 42, the tip 44 of which is adapted to make contact with the periphery of record 4 in the manner above described, and a spring assembly 46 adapted to resiliently urge the finger 42 in toward the periphery of the record 4. One end of the bracket 30 is provided with outwardly bent ears 48 which engage the finger 42 between them as that finger is urged inwardly by the spring assembly 46. Since the ears 48 are fixed with respect to the tone arm, and since the finger 42 is mounted on the shaft 32 for simultaneous rotation therewith, this engagement prevents rotation of the shaft 32 and thus ensures that the wheel 40, which constitutes the member A, will remain in its position shown in Figs. 2 through 8, whereby the stylus 8 is maintained above the level of the record 4. The ears 48 therefore in conjunction with the finger 42 constitute the mechanism B.

Figs. 3 and 4 illustrate the position of the various elements of this apparatus as the tone arm is being lowered with respect to the record 4 but before the wheel 40 makes contact with the record 4. It will be noted that the lower surface of the wheel 40 is positioned below the point of the stylus 8 and that the tip 44 of the finger 42 extends therebelow a distance slightly less than the thickness of a record.

Figs. 5 and 6 show the apparatus at the instant that the wheel 40 comes in contact with the record 4. Since this position, as illustrated in Fig. 1, is outwardly disposed with respect to the intersection of the lines 14 and 18, the moment $M_1$ will be exerted on the tone arm 2 and it will be drawn inwardly with respect to the record to the position illustrated in Fig. 8. It will be noted that when the stylus 8 is held above the record surface, the pick-up cartridge 24 which carries the stylus 8 is by its own weight urged downwardly to a non-parallel position with respect to the tone arm 2, the offset portion 34 of the shaft 32 resting on the top of the pick-up unit 24 (see particularly Figs. 2 and 6).

Figure 7:
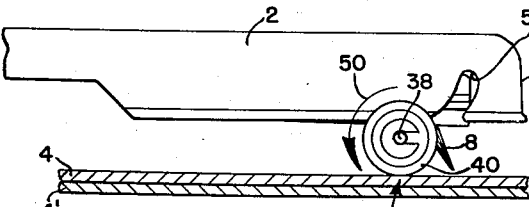
Fig. 7 is a side view of the apparatus of Fig. 6 but taken from the other side.
Figure 8:
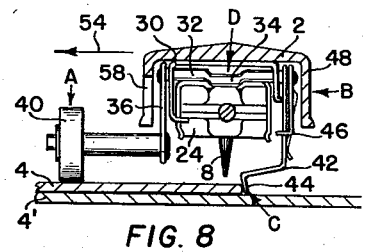
Fig. 8 is a view similar to Fig. 2 showing the apparatus as contact is made with the periphery of the record to be played.
Figure 9:
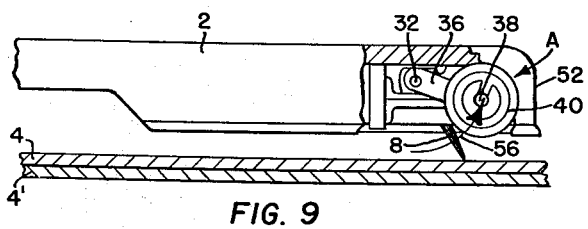
Fig. 9 is a side view, similar to Fig. 7, but partially broken away, showing the apparatus after the stylus has been deposited on the record.
Figure 10:
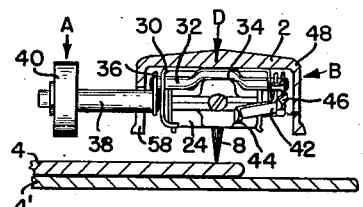
Fig. 10 is a cross-sectional end view corresponding to Fig. 9.

During the time that the wheel 40 is in contact with the record 4, it is rotating with respect to shaft 38 in the direction of the arrow 50 of Fig. 7, this tending to move the shaft 38 toward the tip 52 of the tone arm 2. However, before the shaft 38 can move in that direction, the shaft 32 to which it is attached must rotate. This rotation is, however, prevented by the mechanism B previously described. As the tone arm 2 moves inwardly, the tip 44 of the finger 42 engages the periphery of the record 4. Since the tone arm 2 possesses inertia, and furthermore since the wheel 40 preferably continues to draw the entire assembly inwardly with respect to the record, the tone arm continues to move in the direction of the arrow 54 of Fig. 8, thus distorting the spring assembly 46 and causing the finger 42 to assume the position shown in Fig. 8, in which it becomes disengaged from the ears 48 of the mechanism B. Since, by reason of this disengagement, rotation of the shaft 32 is no longer prevented, the shaft 38 moves along the path indicated by the arrow 56 of Fig. 9, the tone arm being appropriately slotted as at 58 to permit this motion. This causes a rotation of the shaft 32 and thus moves the finger 42 along a path corresponding to the motion of shaft 38, thus removing its tip 44 from peripheral engagement with the record 4 so that the tone arm may move freely.

When the stylus 8 makes contact with the upper surface of the record 4, the pick-up unit 24 will no longer move vertically with respect to the record. Since the unit 24 is pivoted to the tone arm 2, the tone arm 2 continues to move down until it assumes the position of Figs. 9, 10 and 11 in which the tone arm and the pick-up unit 24 are parallel. This relative motion between the tone arm 2 and the pick-up unit 24 is active upon the offset portion 34 of the shaft 32, the offset portion 34 acting as a crank to further rotate the shaft 32 to the position illustrated in Figs. 9 through 11, in which the wheel 40 is completely raised from contact with the record 4. The stylus 8 is then in engagement with the spiral grooves in the record 4 and guides the tone arm over the record for reproduction thereof.

At the end of the record, any mechanism desired may institute a record changing sequence in the automatic record player, which sequence includes lifting the tone arm, by mechanism not here shown, above the record 4. When this occurs, the weight of the wheel 40, which is substantially horizontally displaced from the shaft 32, will exert a moment on that shaft causing it to rotate so as to position the wheel 40 as shown in Fig. 3. As this rotation occurs, the finger 42 also rotates, urged inwardly by the spring assembly 46, and when the rotation has proceeded far enough, the finger 42 snaps into engagement with the ears 48 of the bracket 30, the apparatus thus automatically resetting itself for its next cycle of operation.

While the operation of this apparatus has been illustrated in a case in which the upper record 4 is smaller than the lower record 4', it will be apparent that were the records reversed, the apparatus would still deposit the stylus 8 at the beginning of the top record. Thus with a tone arm furnished with the described apparatus, a record changer could drop or otherwise deposit records of varying sizes on a turntable 6 and the tone arm would automatically adapt itself to the record without the necessity of employing any other control mechanism whatsoever.

The embodiment illustrated in Figs. 12 through 18 is a considerably more simplified construction than that previously described. It does not, however, completely disengaged the member A from the record 4 during reproduction of the record. In this embodiment, the tone arm 2 may be of a more conventional form, the pick-up unit not being movable with respect thereto. The tone arm 2 is provided with a pair of brackets 60, 60' in which shaft 62 is mounted for rotation and axial movement. To that end of shaft 62 which projects toward the center of rotation 16 of the turntable 6 is rigidly attached a segmental cam 64 which constitutes the member A. The cam 64 and shaft 62 may be fastened together by means of screw 66. Suitably positioned on and rigidly attached to the shaft 62 is the finger 68 which constitutes the means C. A spring 70 is active between the finger 68 and the bracket 60' to urge the shaft 62 in a direction toward the center of rotation 16 of the turntable 6. A pin 72, also attached to shaft 62 for simultaneous rotation therewith, makes contact with the bracket 60' so as to limit the axial movement of the shaft 62. A catch 74, which may be a part of or attached to the bracket 60', engages the pin 72 to prevent rotation of the shaft 62, the engagement between the catch 74 and the pin 72 being ensured by action of the spring 70.

As the tone arm 2 is lowered with respect to the record 4, the cam 64 is deposited upon the top surface of the record 4 and is so shaped as to maintain the stylus 8 above the level of the record (see Figs. 12, 13, 14 and 15). Engagement of the cam 64 with the record 4 tends to draw the tone arm inwardly with respect to the record until the tone arm progresses from its position shown in Fig. 12 to its position shown in Fig. 15 in which the finger 68 has made contact with the periphery of the record 4. During this motion, frictional contact between the cam 64 and the record 4 also tends to turn the cam in the direction of arrow 75 of Fig. 14. Such motion of the cam 64, however, is prevented by the mechanism B.

When the finger 68 makes contact with the periphery of the record 4, inward motion of the shaft 62 and cam 64 is thereby positively prevented. The tone arm 2, however, possesses considerable momentum and consequently it will continue to move in the direction of arrow 73 of Fig. 15, thus compressing the spring 70 and causing relative axial movement of the shaft 62 and the tone arm 2. This relative motion will cause the pin 72 to move out of its position of engagement with the catch 74 (Fig. 15). Rotation of the shaft 62 will therefore no longer be prevented and the cam 64 will rotate to its position shown in Fig. 16, thus depositing the stylus 8 on the top surface of the record 4. In this position the finger 68 will also have been rotated out of engagement with the periphery of the record 4 and the spring 70 will retain the pin 72 alongside of the catch 74. The shape of the cam 64 is such that the area of contact between it and the record 4 is minimized and consequently, during reproduction of the record, the cam 64 exerts no appreciable effect upon the operation of the record player.

When the tone arm is subsequently lifted from the record 4 during the next succeeding record changing cycle, the segmental shape of the cam 64 causes it, by its own weight, to rotate to the position shown in Fig. 14. Since the pin 72 is alongside the catch 74, this rotation is not prevented. As soon as this rotation has progressed to a point where the pin 72 is no longer alongside the catch 74, the spring 70 causes axial movement of the shaft 62 with respect to the tone arm 2, the pin 72 springing back to its position illustrated in Fig. 12 in which it engages with catch 74 and rotation of shaft 62 is thereby prevented. The apparatus is therefore in a position for reuse.

While in the embodiments here described the tone arm has been moved inwardly by interaction between the member A and the record 4, it will be appreciated that any other means for moving the tone arm inwardly with respect to the record may be employed, such as a pull-in spring or an unbalance of the tone arm 2.

If the above-described apparatus be attached to a tone arm, it will be apparent that the record player of which said tone arm is a part can play successively a stack of records of indiscriminately mixed sizes, the tone arm adjusting itself automatically and simply and without the necessity of employing complicated and fragile control mechanism, to the size of the record being played.

It will be apparent that many departures from the specific constructions here illustrated may be indulged in without avoiding the spirit of the invention as defined in the following claims:

I claim:

1. An indexing apparatus for a tone arm carrying a stylus adapted to move inwardly of a record, comprising a first means carried by said tone arm for engaging the top surface of said record and movable between a position below the stylus tip for holding said stylus above the level of said record and a position even with or above the stylus tip for depositing the stylus thereon, mechanism operatively connected to said first means for maintaining said first means in its stylus-holding position, and a second means mounted on said tone arm so as to be movable with respect thereto, in a direction substantially parallel to the movement of said stylus inwardly over said record, between an inoperative position and an operative position in which it is operatively connected to said mechanism and effective to release said mechanism from said first means, said second means depending below and to one side of said first means when said first means is in its stylus-holding position, said second means thus being brought into contact with the periphery of said record as the tone arm moves inwardly with respect thereto and being moved thereby to its operative position, said first means being thereupon movable to its stylus-depositing position.

2. An indexing apparatus for a tone arm carrying a stylus and adapted to move inwardly over a record, consisting of a stylus lifting member articulately mounted on and depending from said tone arm for engaging the top surface of said record, said member being movable between a position below the stylus tip for holding the stylus above the level of said record and a position even with or above the stylus tip for depositing the stylus thereon, a catch on said tone arm operatively engageable with said lifting member when said lifting member is in its stylus-holding position and effective to retain it in that position, and a catch actuator operatively connected to said catch and mounted on said tone arm so as to be movable, in a direction substantially parallel to the movement of said stylus inwardly over said record, between an inoperative position and an operative position in which said catch is disengaged from said lifting member, said actuator depending from said tone arm below and to one side of said lifting member so as to make contact with and be moved by the periphery of said record as the tone arm moves inwardly thereover.

3. In the indexing apparatus of claim 1, means operatively connected to said first means to lift said first means from the top surface of said record when said stylus is deposited thereon.

4. In the indexing apparatus of claim 1, means operatively connected to said first means and to said tone arm and actuated by the weight of the tone arm to lift said first means from the top surface of said record when said stylus is deposited thereon.

5. An indexing apparatus for a tone arm carrying a stylus adapted to move inwardly over a record comprising a member operatively connected to said tone arm and depending below said stylus tip so as to make contact with the upper surface of said record as the tone arm is lowered with respect thereto and hold the stylus above the level of said upper surface, said member being movable to an inoperative position in which it is even with or above said stylus tip so as to deposit said stylus on said record surface, a shaft to which said member is attached, said shaft being movable with respect to said tone arm, mechanism operatively connected to said shaft to prevent said motion of said shaft, and means on said shaft and movable therewith depending below and to one side of said member when said member depends below said stylus tip so as to make contact with the periphery of said record as the tone arm moves inwardly with respect thereto, said means being movable relative to said tone arm, in a direction substantially parallel to the movement of said stylus inwardly of said record, into a position in which it is operatively connected to said mechanism and effective to release said mechanism from said shaft and thus permit motion of said shaft upon engagement of said means with the periphery of said record, whereby said member is movable to its operative position to deposit the stylus on the upper surface of the record.

6. An indexing apparatus for a tone arm carrying a stylus adapted to move inwardly over a record comprising a member operatively connected to said tone arm and depending below said stylus tip so as to make contact with the upper surface of said record as the tone arm is lowered with respect thereto and hold the stylus above the level of said upper surface, said member being movable to an inoperative position in which it is even with or above said stylus tip so as to deposit said stylus on said record surface, a shaft to which said member is attached, said shaft being rotatable with respect to said tone arm, mechanism operatively connected to said shaft to prevent rotation of said shaft, and means on said shaft and rotatable therewith depending below and to one side of said member when said member depends below said stylus tip so as to make contact with the periphery of said record as the tone arm moves inwardly with respect thereto, said means being movable relative to said tone arm, in a direction substantially parallel to the movement of said stylus inwardly of said record, into a position in which it is operatively connected to said mechanism and effective to release said mechanism from said shaft and thus permit motion of said shaft upon engagement of said means with the periphery of said record, whereby said member is movable to its operative position to deposit the stylus on the upper surface of the record.

7. An indexing apparatus for a tone arm carrying a stylus comprising a member operatively connected to said tone arm and depending below said stylus tip so as to make contact with the upper surface of a record as the tone arm is lowered with respect thereto and hold the stylus above the level of said upper surface, said member being movable to an inoperative position in which it is even with or above said stylus tip so as to deposit said stylus on said record surface, a shaft to which said member is attached, said shaft being rotatably and axially movable with respect to said tone arm, mechanism operatively connected to said shaft to prevent rotation of said shaft when said shaft is in one axial position, and means on said shaft and rotatably and axially movable therewith depending below and to one side of said member when said member depends below said stylus tip so as to make contact with the periphery of said record as the tone arm moves inwardly with respect thereto, said means being operable upon engagement with the periphery of said record to cause axial movement of said shaft with respect to said tone arm to another axial position and thus release said shaft from said mechanism, whereby said shaft is rotatable to move said member to deposit the stylus on the upper surface of the record.

8. The indexing apparatus of claim 7, in which a resilient means is active on said shaft to urge it toward said one axial position, axial movement of said shaft with respect to said tone arm to another axial position compressing said resilient means.

9. The indexing apparatus of claim 7, in which said member is mounted on said shaft with its center of gravity out of line with said shaft and with a surface adapted to engage the upper surface of said record, rotation of said record tending to rotate said member to its stylus-depositing position, and the weight of said member, when it is disengaged from said record, tending to rotate said member to its stylus-holding position.

10. The indexing apparatus of claim 7, in which a resilient means is active on said shaft to urge it toward said one axial position, axial movement of said shaft with respect to said tone arm to another axial position compressing said resilient means, and in which said member is mounted on said shaft with its center of gravity out of line with said shaft and with a surface adapted to engage the upper surface of said record, rotation of said record tending to rotate said member to its stylus-depositing position, and the weight of said member, when it is disengaged from said record, tending to rotate said member to its stylus-holding position.

11. An indexing apparatus for a tone arm carrying a stylus comprising a rotatable member carried by said tone arm and adapted to make contact with the upper surface of a record having an initial groove as the tone arm is lowered with respect thereto, said member being rotatable between a first position extending below said stylus tip so as to prevent the lowering of said stylus to the level of said upper surface and a second position even with or above said stylus tip to permit said lowering, a rotatable and axially movable shaft to which said member is attached for simultaneous rotation, means rigidly attached to said shaft extending to one side of and depending below said member so as to make contact with the periphery of a record and cause axial movement of said shaft with respect to said tone arm, mechanism operatively connected to said shaft to prevent rotation of said shaft and said member from their first position when said shaft is in one axial position, said mechanism being released by axial movement of said shaft with respect to said tone arm to another axial position, said member being mounted on said shaft with its center of gravity out of line with said shaft and with a surface adapted to engage the upper surface of said record, rotation of said record tending to rotate said member to its stylus-depositing position, and the weight of said member when it is disengaged from said record, tending to rotate said member to its stylus-holding position.

12. In the indexing apparatus of claim 11, resilient means active on said shaft to urge it toward said one axial position, said resilient means causing said mechanism and said shaft to resume their rotation-preventing relationship when said member resumes its first position.

13. An indexing apparatus for a tone arm carrying a stylus-bearing pick-up unit adapted to move inwardly over a record comprising a member operatively connected to said tone arm and adapted to make contact with the upper surface of said record as the tone arm is lowered with respect thereto and hold the stylus above the level of said upper surface, a shaft to which said member is attached, said shaft being rotatable with respect to said tone arm, means on said shaft and rotatable therewith but otherwise movable with respect thereto in a direction substantially parallel to the movement of said stylus inwardly over said record adapted to make contact with the periphery of said record as the tone arm moves inwardly with respect thereto, and mechanism on said tone arm active upon said means to prevent rotation of said shaft, said means being moved upon engagement with the periphery of said record to disengage itself from said mechanism, whereby said shaft is rotated to move said member to deposit the stylus on the upper surface of the record and remove said means from contact with the periphery of the record.

14. The indexing apparatus of claim 13, in which said member is attached to said shaft by an element projecting therefrom, and in which said shaft is disposed between said tone arm and said pick-up unit and is provided with an offset portion, said pick-up unit being movable relative to said tone arm to engage said offset portion and rotate said shaft.

15. An indexing apparatus for a tone arm carrying a stylus-bearing pick-up unit adapted to move inwardly over a record in which said pick-up unit is attached to said tone arm so as to be vertically movable with respect thereto comprising a member operatively connected to said tone arm and adapted to make contact with the upper surface of said record as the tone arm is lowered with respect thereto and to prevent lowering of said stylus to the level thereof, a shaft to which said member is attached, said shaft being rotatable with respect to said tone arm and having an offset portion positioned between said tone arm and said pick-up unit, means on said shaft adapted to make contact with the periphery of a record as said tone arm moves inwardly with respect thereto, and mechanism to prevent rotation of said shaft, said mechanism being releasable upon engagement of said means with the periphery of said record, rotation of said shaft upon release of said mechanism permitting said member to move to deposit the stylus on the upper surface of the record and remove said means from contact with the periphery of the record, action of said tone arm and said pick-up unit on the offset portion of said shaft then removing said member from contact with said surface.

16. An indexing apparatus for a tone arm carrying a stylus-bearing pick-up unit adapted to move inwardly over a record in which said pick-up unit is pivotally attached to said tone arm so as to be vertically pivotable with respect thereto comprising a member operatively connected to said tone arm and adapted to make contact with the upper surface of said record as the tone arm is lowered with respect thereto and to prevent lowering of said stylus to the level thereof, a shaft to which said member is attached so as to be non-coaxial therewith, said shaft being rotatable with respect to said tone arm and having an offset portion positioned between said tone arm and said pick-up unit, a resilient means on said shaft and rotatable therewith adapted to make contact with the periphery of a record as said tone arm moves inwardly with respect thereto, and mechanism on said tone arm engageable with said means to prevent rotation of said shaft, engagement of said means with the periphery of said record resiliently deflecting said means out of engagement with said mechanism to permit rotation of said shaft, rotation of said shaft moving said member to a position permitting depositing of the stylus on the upper surface of the record and simultaneously removing said means from contact with the periphery of the record, action of said tone arm and said pick-up unit on the offset portion of said shaft then removing said member from contact with said surface.

BERNE N. FISHER.

REFERENCES CITED

The following references are of record in the file of this patent:

UNITED STATES PATENTS

| Number | Name | Date |
| --- | --- | --- |
| 1,453,966 | Yungstrom | May 1, 1923 |
| 1,457,354 | Fisher | June 5, 1923 |
| 1,538,667 | Smith | May 19, 1925 |
| 1,588,389 | Mitchell | June 8, 1926 |
| 1,729,224 | Madsen | Sept. 24, 1929 |
| 2,214,509 | Otto | Sept. 10, 1940 |
| 2,334,649 | Recker | Nov. 16, 1943 |

FOREIGN PATENTS

| Number | Country | Date |
| --- | --- | --- |
| 315,379 | Great Britain | Jan. 30, 1930 |
| 112,618 | Sweden | Dec. 5, 1944 |
| 238,176 | Switzerland | Oct. 1, 1945 |